United States Patent
Bellinger et al.

[19]

[11] Patent Number: 6,135,918
[45] Date of Patent: Oct. 24, 2000

[54] SYSTEM FOR CONTROLLING OPERATION OF AN INTERNAL COMBUSTION ENGINE

[75] Inventors: Steven M. Bellinger; John V. Shutty, both of Columbus, Ind.

[73] Assignee: Cummins Engine Company, Inc., Columbus, Ind.

[21] Appl. No.: 09/315,722

[22] Filed: May 20, 1999

Related U.S. Application Data

[62] Division of application No. 09/099,545, Jun. 18, 1998.

[51] Int. Cl.[7] .............................. B60T 41/04; B60T 8/24
[52] U.S. Cl. .............................. 477/111; 701/94; 477/107
[58] Field of Search .................................... 477/107, 110, 477/120, 124, 901; 701/94; 74/335

[56] References Cited

U.S. PATENT DOCUMENTS

| | | | |
|---|---|---|---|
| 4,193,380 | 3/1980 | Marchak et al. | 123/32 EG |
| 4,217,867 | 8/1980 | Madsen et al. | 123/350 |
| 4,252,096 | 2/1981 | Kennedy | 123/370 |
| 4,502,442 | 3/1985 | Talakuwa et al. | 123/417 |
| 4,564,906 | 1/1986 | Stephen et al. | 701/51 X |
| 4,805,579 | 2/1989 | Toshimitsu et al. | 123/492 |
| 4,914,597 | 4/1990 | Moncelle et al. | 364/426.04 |
| 5,019,986 | 5/1991 | Londt et al. | 701/94 |
| 5,025,380 | 6/1991 | Wataya et al. | 364/431.05 |
| 5,083,277 | 1/1992 | Shutler | 701/100 |
| 5,189,621 | 2/1993 | Onari et al. | 123/480 X |
| 5,257,193 | 10/1993 | Kusaka et al. | 364/431.07 |
| 5,406,862 | 4/1995 | Amsallen | 477/901 X |
| 5,445,014 | 8/1995 | Fiorenza, II et al. | 73/117.3 |
| 5,447,138 | 9/1995 | Barnes | 123/446 |
| 5,457,633 | 10/1995 | Palmer et al. | 477/181 X |
| 5,490,063 | 2/1996 | Genise | 477/120 X |
| 5,517,410 | 5/1996 | Nakagawa et al. | 364/424.1 |
| 5,612,873 | 3/1997 | Ogawa | 364/424 |

OTHER PUBLICATIONS

Caterpillar, "Lower Gears Engine RPM Limit," Programming Cat Electronic Truck Engines, pp. 51–55 (Aug. 3, 1996).

Detroit Diesel Corporation, "Progressive Shift," DDEC III Application and Installation, pp. 19–1–19–3 (Mar. 3, 1995).

*Primary Examiner*—Khoi Q. Ta
*Attorney, Agent, or Firm*—Baker & Daniels

[57] ABSTRACT

A system for controlling operation of an internal combustion engine includes a control computer responsive to a number of engine/vehicle operating conditions to control engine operation to thereby control engine speed and engine or vehicle acceleration. In one embodiment, the control computer is configured to determine an engine or vehicle acceleration limit value based on current engine or vehicle speed, and an engine speed limit value based on current engine load, and to control engine fueling and/or speed to thereby limit engine speed to the engine speed limit value and/or engine/vehicle acceleration to the engine/vehicle acceleration limit value. In another embodiment, the control computer is configured to determine a pseudo-load value, which is preferably a vehicle mass value and/or road grade value estimated from current vehicle acceleration and engine fueling conditions, determine an engine speed limit value based on the pseudo-load value and current vehicle speed, and control engine speed and/or fueling to thereby limit engine speed to the pseudo-load-based engine speed limit value. In either case, the concepts of the present invention provide for increased fuel economy by limiting engine speed and/or acceleration during shifting, while providing for additional engine speed, and correspondingly higher engine power, when there exists a legitimate need therefore.

9 Claims, 9 Drawing Sheets

SYSTEM FOR CONTROLLING OPERATION OF AN INTERNAL COMBUSTION ENGINE

CROSS REFERENCE TO RELATED U.S. APPLICATION

This application is a divisional of U.S. application, Ser. No. 09/099,545 filed Jun. 18, 1998.

FIELD OF THE INVENTION

The present invention relates generally to systems for electronically controlling and managing the operation of internal combustion engines, and more specifically to such systems for controlling engine performance particularly during shifting operations.

BACKGROUND OF THE INVENTION

Electronic control systems for managing the operation of internal combustion engines are well known and widely used in the automotive and tractor truck industries. Such systems are typically operable to control engine fueling as well as many other engine and/or vehicle operating conditions.

Figure 1:
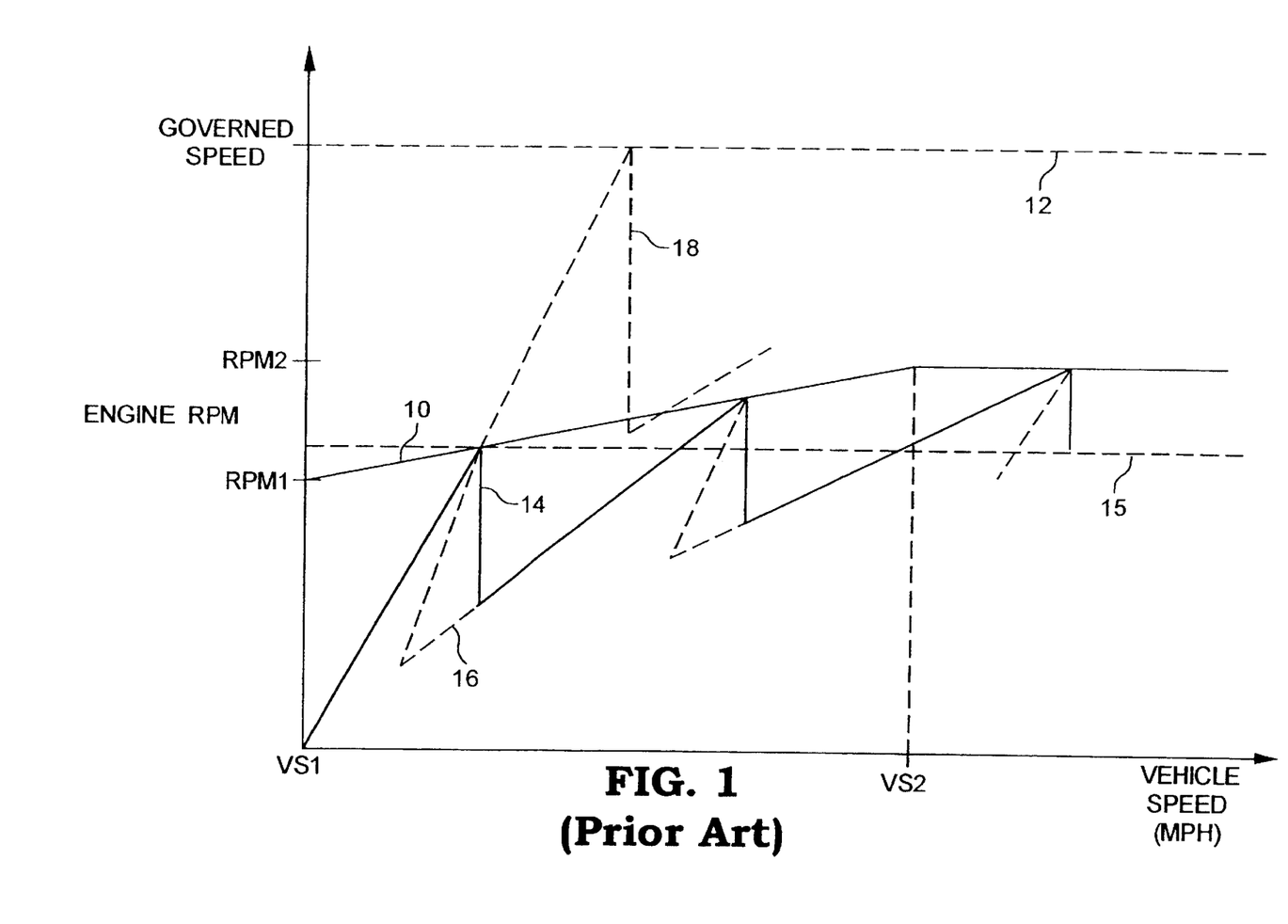
FIG. 1 is a plot of engine speed vs. vehicle speed illustrating a prior art technique for limiting engine speed to thereby encourage shifting at lower engine speeds in the lower transmission gears.

Designers of electronic engine control systems have heretofore devised numerous techniques for controlling engine fueling during various engine operating conditions, and one such technique is illustrated in FIG. 1. Referring to FIG. 1, a prior art technique for controlling engine fueling to thereby limit engine speed during manual gear shifting operations is illustrated, wherein such a technique is commonly referred to as progressive shift control. FIG. 1 shows a graph of engine RPM vs. vehicle speed, wherein a linear engine speed limit 10 is typically established by specifying a first engine speed limit RPM1 at a first vehicle speed VS1 and a second engine speed limit RPM2 at a second vehicle speed VS2. The engine speed limit 10 linearly increases from RPM1 to RPM2 between VS1 and VS2 and is held constant at RPM2 beyond VS2, wherein RPM2 is typically less than rated engine speed 12. Rated engine speed, also known as governed engine speed, is defined for purposes of the present invention as the engine speed at which the engine produces an advertised horsepower value.

The purpose of progressive shift control is to gradually increase available engine speed (and thus more engine power) as vehicle speed increases between VS1 and VS2, wherein typical values for VS1 and VS2 are 0.0 and 40 mph respectively. This engine speed limiting scheme accordingly encourages the vehicle operator to manually shift gears at lower engine speeds than may otherwise occur, particularly in the lower transmission gears, thereby resulting in fuel savings associated with more efficient engine operation. This feature is illustrated by gear shifting pattern 14 wherein three gear shifts are shown, each occurring at progressively increasing engine speed values.

While the progressive shift control feature 14 illustrated in FIG. 1 achieves the goal of encouraging vehicle operators to shift at lower engine speeds, it has certain drawbacks associated therewith. For example, under high engine load operating conditions, such as when traversing a grade and/or when hauling a heavily loaded trailer, providing a hard limit 10 on available engine speed can hinder the drivability of the vehicle. One example of such hindered drivability is shown by shifting pattern 16 of FIG. 1, which illustrates the effect on the shifting pattern 14 of a steep grade encountered by the same vehicle. Under such operating conditions, the limit 10 on engine speed causes the vehicle operator to shift sooner than would otherwise be preferred and the effect of the steep grade causes additional loss in both engine speed and vehicle speed over that of shifting pattern 14. Under severe operating conditions, the vehicle may accordingly have insufficient momentum to justify a shift to the next higher gear, thereby defeating the purpose of engine speed limit 10. What is needed under such conditions, is the ability to increase engine speed up to rated engine speed 12 before shifting to the next higher gear as illustrated by shifting pattern 18 in FIG. 1, wherein engine speed following a shift should ideally remain above a peak torque engine RPM 15. This scenario would improve grade climbing performance as well as the likelihood of successfully completing the shift, wherein both of these improvements result from additional kinetic energy present in the vehicle prior to the shift and from the increased engine power before and after the shift.

What is therefore needed is a system for controlling engine operation to thereby achieve the same fuel economy goals as progressive shift control while also allowing for additional engine speed only when the need therefore legitimately exists.

SUMMARY OF THE INVENTION

The foregoing shortcomings of the prior art are addressed by the present invention. In accordance with one aspect of the present invention, a system for controlling an internal combustion engine comprises means for sensing road speed of a vehicle carrying an internal combustion engine and producing a vehicle speed signal corresponding thereto, a fuel system responsive to a fueling signal to supply fuel to the engine, and a control computer producing the fueling signal. The control computer is responsive to the fueling signal to determine an engine speed limit and to the vehicle speed signal to determine one of an engine and a vehicle acceleration limit, the control computer limiting the fueling signal as a function of the engine speed limit and the engine or vehicle acceleration limit.

In accordance with another aspect of the present invention, a method for controlling an internal combustion engine carried by a vehicle comprises sensing engine speed of an internal combustion engine, sensing vehicle speed of a vehicle carrying the engine, determining an acceleration value based on one of engine and vehicle speed, determining a corresponding one of an engine and a vehicle acceleration limit based on vehicle speed, determining a current engine fueling value, determining an engine speed limit based on the current engine fueling value, and limiting fuel supplied to the engine to thereby maintain the engine speed value below the engine speed limit and the acceleration value below the corresponding one of an engine and a vehicle acceleration limit.

In accordance with a further aspect of the present invention, a system for controlling an internal combustion engine comprises means for sensing speed of an internal combustion engine and producing a corresponding engine speed signal, means for sensing road speed of a vehicle carrying the engine and producing a corresponding vehicle speed signal, a fuel system responsive to a fueling signal to supply fuel to the engine, and a control computer producing the fueling signal. The control computer is responsive to the vehicle speed signal to determine a corresponding vehicle acceleration value and to at least the vehicle acceleration value to determine an estimated engine load value, the control computer determining an engine speed limit based on the estimated engine load value and controlling the fueling signal to thereby maintain the engine speed value below the engine speed limit.

In accordance with yet another aspect of the present invention, a method for controlling an internal combustion engine carried by a vehicle comprises sensing engine speed of an internal combustion engine, sensing vehicle speed of a vehicle carrying the engine and determining a corresponding vehicle acceleration value, estimating an engine load value based on at least the vehicle acceleration value, determining an engine speed limit based on at least the engine load value, and limiting fuel supplied to the engine to thereby maintain the engine speed value below the engine speed limit.

One object of the present invention is to provide a system for controlling engine operation to thereby maximize fuel economy during shifting while allowing for increased engine performance when a need therefore legitimately exists.

Another object of the present invention is to provide such a system operable to control engine speed and engine and/or vehicle acceleration during shifting to achieve the aforementioned goals.

A further object of the present invention is to provide such a system operable to control engine speed based on an estimated vehicle mass.

These and other objects of the present invention will become more apparent from the following description of the preferred embodiment.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 2:
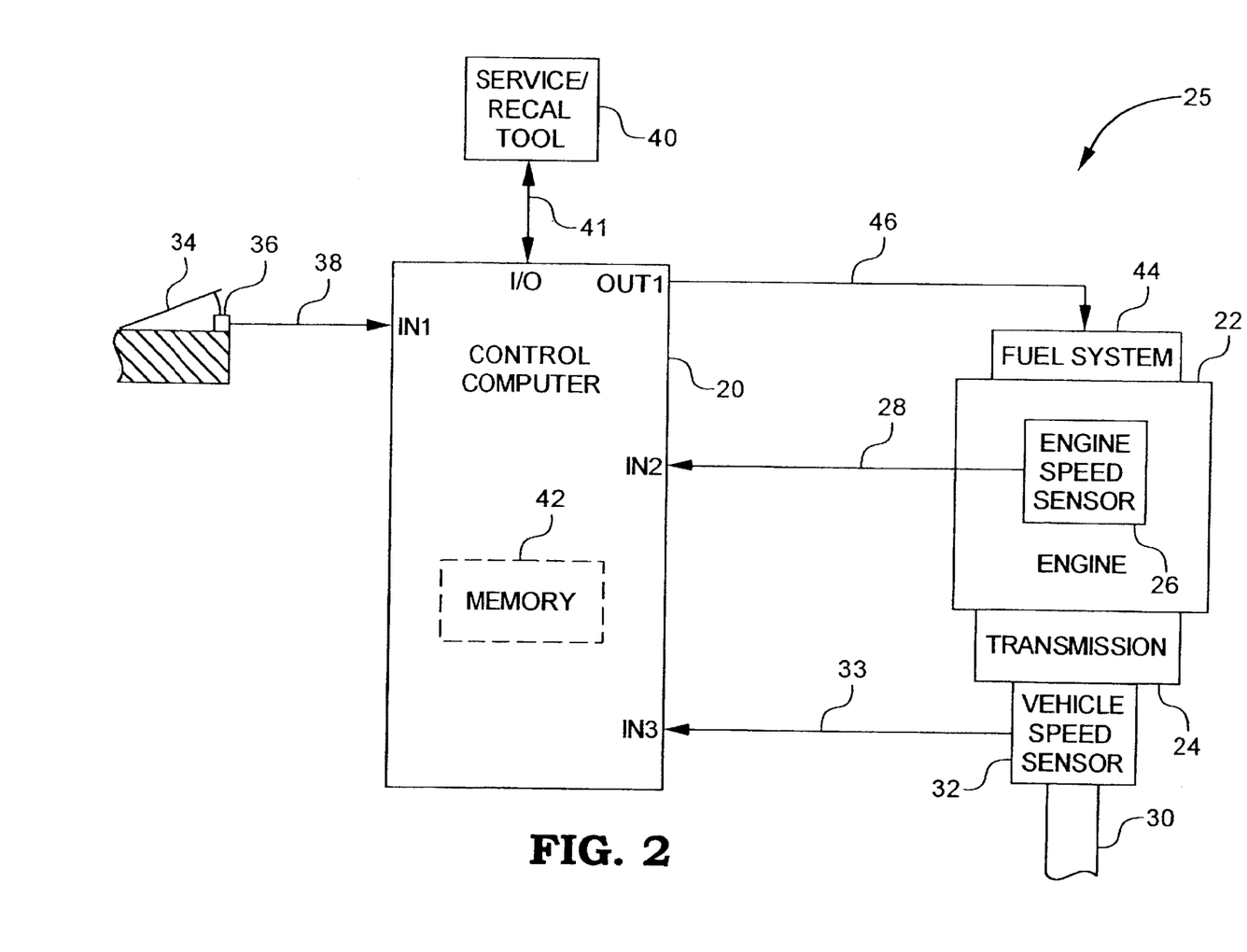
FIG. 2 is a diagrammatic illustration of one embodiment of a system for controlling engine operation in accordance with the present invention.

Referring now to FIG. 2, one preferred embodiment of a system 25 for controlling engine operation, in accordance with the present invention, is shown. Central to system 25 is a control computer 20 which interfaces with various engine and/or vehicle components as will be discussed more fully hereinafter. Control computer 20 is preferably microprocessor-based and includes at least a memory portion 42, digital I/O and a number of analog-to-digital (A/D) inputs. The microprocessor portion of control computer 20 runs software routines and manages the overall operation of system 25 and is, in one preferred embodiment, a Motorola 68336 or equivalent microprocessor. However, the present invention contemplates using any one of a number of known microprocessors capable of managing and controlling system 10. The memory portion 42 of control computer 20 may includes ROM, RAM, EPROM, EEPROM, FLASH memory and/or any other memory known to those skilled in the art. Memory portion 42 may further be supplemented by external memory connected thereto (not shown).

An internal combustion engine 22 is operatively connected to a main transmission 24 as is known in the art. A propeller shaft, or tailshaft, 30 extends from transmission 24, whereby transmission 24 is operable to rotatably actuate propeller shaft 30 and thereby provide driving power to one or more vehicle wheels via a drive axle (not shown) as is known in the art. System 25 may further include, particularly as is known in the heavy duty tractor truck art, one or more auxiliary transmissions and interconnecting propeller shafts (not shown), power take off (PTO) devices, and other known drivetrain components.

A number of sensors and actuators permit control computer 20 to interface with some of the various components of system 25 as well as other vehicle and/or engine systems. For example, engine 22 includes an engine speed sensor 26 which is electrically connected to input IN2 of control computer 20 via signal path 28. Engine speed sensor 26 is preferably a known Hall-effect device operable to sense speed and/or position of a toothed gear rotating synchronously with the engine crank shaft. However, the present invention contemplates using any known engine speed sensor 26, such a variable reluctance sensor or the like, which is operable to sense engine rotational speed and provide a signal to control computer 20 corresponding thereto.

A vehicle speed sensor 32 is preferably positioned about propeller shaft 30 adjacent to transmission 24, and is electrically connected to input IN3 of control computer 20 via signal path 33. Vehicle speed sensor 32 is preferably a variable reluctance sensor operable to sense rotational speed of propeller shaft 30 and provide a vehicle speed signal to control computer 20 corresponding thereto. While vehicle speed sensor 32 is shown in FIG. 2 as being located adjacent to transmission 24, it is to be understood that sensor 32 may alternatively be located anywhere along propeller shaft 30. Moreover, the present invention contemplates using any other known vehicle speed sensor operable to provide control computer 20 with a vehicle speed signal indicative of vehicle road speed.

Control computer 20 further includes an I/O port that is configured to interface with a known service/recalibration tool 40 via signal path 41. Tool 40 is operable, as is known in the art, to exchange information with control computer 20, wherein such data may include, but is not limited to, calibration/recalibration information such as fueling maps and the like, trip or other accumulated engine/vehicle operational data, and fault/diagnostic data.

System 25 further includes a fueling system 44 which is electrically connected to output OUT1 of control computer 20 via signal path 46. Fueling system 44 is responsive to fueling signals (e.g. commanded fuel) provided by control computer 20 on signal path 46 to supply fuel to engine 22 as is known in the art.

An accelerator pedal 34 preferably includes an accelerator pedal position or deflection sensor 36 that is electrically connected to input IN1 of control computer 20 via signal path 38. Sensor 36 is, in one preferred embodiment, a potentiometer electrically connected to a suitable voltage and having a wiper that is electrically connected to signal path 38 and mechanically connected to pedal 34 so that the voltage on signal path 38 corresponds directly to the position, or deflection, of the accelerator pedal 34. The present invention further contemplates that other known sensors may be alternatively associated with accelerator pedal 34 to provide one or more analog and/or digital signals corresponding to accelerator pedal position or pressure applied to pedal 34. In any event, such a sensor is operable to provide control computer 20 with an accelerator pedal signal indicative of driver requested torque.

Transmission 24 may be any known manual or manual/automatic transmission having one or more manually selectable gear ratio associated therewith. Transmission 24 includes a mechanical input coupled, via mechanical linkage, to a gear shift lever (not shown) which is actuated by the vehicle operator to thereby select the various manually selectable gear ratios. In accordance with the present invention, control computer 20 is operable to control engine speed, preferably as a function of engine load and engine acceleration, thereby encouraging manual shifting at lower engine speeds in the lower gears while also making more engine speed (and higher engine torque) available when there exists a legitimate need therefore (such as when climbing steep grades). One benefit of such engine control is fuel savings associated with lower engine speed operation under typical engine/vehicle operating conditions while providing for enhanced engine performance when a need therefore exists.

Figure 3:
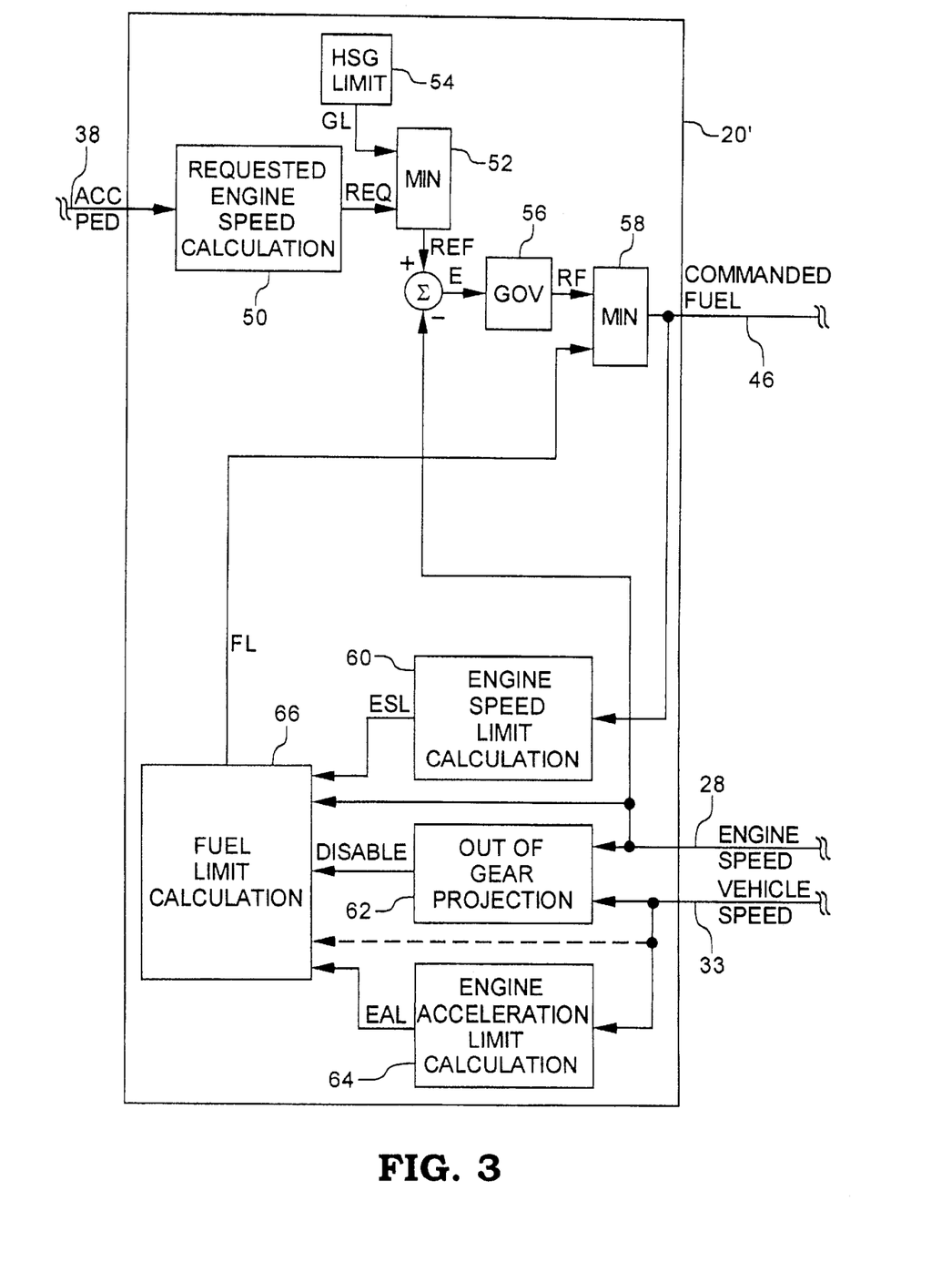
FIG. 3 is a diagrammatic illustration of one embodiment of the control computer of FIG. 2 showing some of the internal features thereof as they relate to the present invention.

Referring now to FIG. 3, one preferred embodiment 20' of a portion of the control computer 20 of FIG. 2 illustrating some of the internal features thereof as they relate to the present invention, is shown. While the internal features of control computer 20' illustrated in FIG. 3 are shown in block form, it is to be understood that such blocks are merely graphical representations of functions or processes that are performed by control computer 20'. In any event, control computer 20' includes a requested engine speed calculation block 50 receiving the requested torque signal from accelerator pedal sensor 36 via signal path 38. Block 50 is operable to calculate a requested engine speed value REQ based at least in part on the requested torque signal, as is known in the art, wherein REQ is provided to one input of a MIN block 52. A high speed governor (HSG) limit block 54 provides an HSG engine speed limit value GL to a second input of MIN block 52, wherein MIN block 52 is operable to provide the minimum of the REQ and GL values as a reference speed REF at an output thereof. In one embodiment, the HSG engine speed limit value GL corresponds to a maximum allowable governed engine RPM, although the present invention contemplates setting GL at other desired engine speed values, wherein GL is preferably a programmable parameter that may be accessed via the service/recalibration tool 40.

The engine speed reference value REF is provided to a non-inverting input of a summing node Σ, wherein node Σ also includes an inverting input receiving the engine speed signal provided on signal path 28. Summing node Σ produces an error value E that is provided to a known engine speed governor block 56. Engine speed governor 56 produces a requested fuel value RF at an output thereof which is provided to one input of another MIN block 58. MIN block 58 provides the commanded fuel signal to fuel system 44 on signal path 46.

An engine speed limit calculation block 60 is connected to signal path 46 and receives the commanded fuel signal at an input thereof. Block 60 is operable to process the commanded fuel signal and provide an engine speed limit value (ESL) as a function thereof. In one embodiment, block 60 is operable to compute engine load as a function of commanded fueling as is known in the art, and determine an appropriate engine speed limit value (ESL) based on the current engine load value. Alternatively, the present invention contemplates computing, in block 60, a current engine load value according to any known technique (i.e. as a function of one or engine operational parameters in addition to or separate from commanded fueling) and determining ESL as a function thereof. Preferred techniques for determining ESL as a function of current engine load will be described more fully hereinafter with respect to FIGS. 4 and 6. In any event, ESL is provided to a first input of a fuel limit calculation block 66.

An engine acceleration limit calculation block 64 is connected to signal path 33 and receives the vehicle speed signal at an input thereof. Block 64 is operable to process the vehicle speed signal and provide an engine acceleration limit value (EAL) as a function thereof. Alternatively, the present invention contemplates determining EAL according to other indicia of vehicle speed such as, for example, presently engaged gear ratio, or the like. In any case, preferred techniques for determining EAL as a function of current vehicle speed will be described more fully hereinafter with respect to FIGS. 4 and 6. Regardless of the particular technique for determining EAL, block 64 is operable to provide the EAL value to a second input of a fuel limit calculation block 66.

Figure 5:
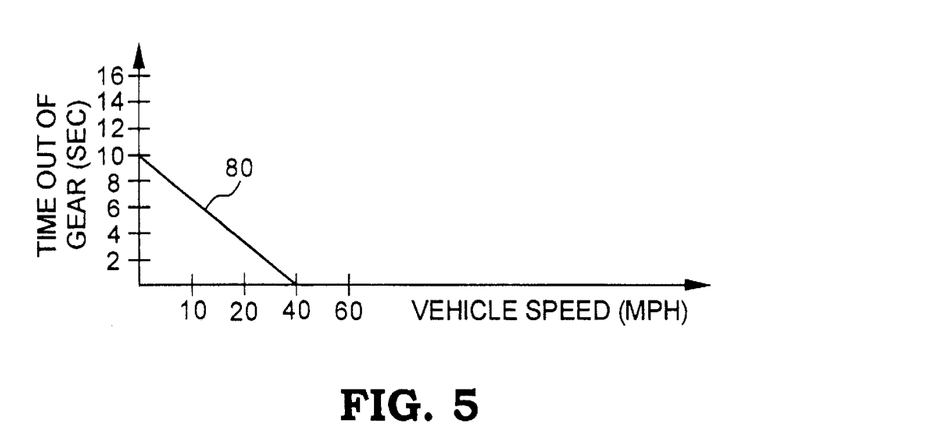
FIG. 5 is a plot of time out of gear vs. vehicle speed illustrating one embodiment of an engine control delay technique for use with the present invention.

An out of gear protection block 62 is connected to signal paths 28 and 33, and accordingly receives the engine speed and vehicle speed signals at inputs thereof. Block 62 is operable to process the engine and vehicle speed signals, and provide a disable value as a function thereof. The purpose of block 62 is to disable the engine speed/acceleration limiting feature of the present invention while a transmission out-of-gear condition exists (e.g. pursuant to a gear shift). Preferably, block 62 is operable to disable the engine speed/acceleration limiting feature immediately upon detection of an out-of-gear condition above some predetermined vehicle speed, and to delay disablement of the feature for some time period at low vehicle speeds. In either case, once disabled, block 62 is operable to re-enable the engine speed/acceleration feature upon detection of a completed gear shift. In one embodiment, block 62 is operable to determine the presently engaged gear ratio, and whether an out-of-gear condition exists, by computing a ratio of engine speed and vehicle speed as is known in the art. However, the present invention contemplates using other known techniques for determining gear engagement status, and those skilled in the art will recognize that any such mechanisms and/or techniques may be used without detracting from the scope of the present invention. In any event, if an out-of-gear condition exists, block 62 is operable to produce a disable signal to thereby disable the engine speed/acceleration limiting feature of the present invention as will be described in greater detail hereinafter. The purpose of such disablement is to allow operator control of a full range of engine speeds to facilitate achievement of synchronous engine speed for completing a shift. As a practical matter, and from a safety standpoint, disablement of the engine speed/acceleration limiting feature is typically a concern only at higher vehicle speeds, and the feature is accordingly preferably disabled immediately upon detection of an out-of-gear condition at high vehicle speeds (e.g., above 40 mph). At low vehicle speeds, however, engine speeds tend to change more rapidly (e.g. such as when attempting to accelerate up to highway speed) and if the engine speed/acceleration limiting feature is disabled immediately upon detection of an out-of-gear condition, then by the time a valid gear ratio is detected the vehicle operator may have commanded the engine speed above the engine speed limit allowed by the engine speed/acceleration limiting feature. Thus, when the engine speed/acceleration limiting feature is subsequently re-enabled, control computer 20 will respond to the excessive engine speed by commanding zero fuel until current engine speed is reduced below the engine speed limit established by the engine speed/acceleration limiting feature. This potentially large step reduction in engine speed is annoying to the driver, and is unnecessary at low vehicle speeds. Accordingly, block 62 is preferably operable to delay production of the disable signal for some time period at low vehicle speeds and as a function of vehicle speed, an example of which is illustrated in FIG. 5. If the operator is experiencing trouble finding synchronous engine speed at low vehicle speeds, block 62 is preferably operable to produce the disable signal upon expiration of the delay time period, after which the operator will be provided with a full range of available engine speeds. Referring to FIG. 5, one preferred delay technique is illustrated as a plot 80 of time out of gear vs. vehicle speed. As vehicle speed increases, the delay until production of the disable signal is reduced. Above some vehicle speed (e.g. 40 mph), no delay occurs. Those skilled in the art will recognize that plot 80 of FIG. 5 represents only one preferred embodiment of a delay technique as described above, and that other delay techniques may be used, either in graphical, table or equation form, for example, to achieve a desired delay profile. Referring again to FIG. 3, block 62 is operable in any case to provide a disable value or signal to a third input of fuel limit calculation block 66.

Fuel limit calculation block 66 receives as inputs the ESL value from block 60, the EAL value from block 64, the disable value from block 62, the engine speed signal on signal path 28, and optionally the vehicle speed signal on signal path 33, and is operable to compute a fueling limit FL value as a function thereof and provide the FL value to a remaining input of MIN block 58. The commanded fuel signal provided on signal path 46 is accordingly the minimum of the requested fueling value RF produced by the engine speed governor 56 and the fuel limit value FL produced by block 66. Preferably, block 66 is responsive to the disable signal provided by block 62 to set FL to some fueling value above RF (e.g. such as a maximum fuel level), so that when the engine speed/acceleration limiting feature of the present invention is disabled, MIN block 58 is operable to pass the RF value therethrough as the commanded fuel value, although the present invention contemplates other configurations of control computer 20' for accomplishing the same task. When the disable signal is not present, block 66 is operable to determine the fuel limit value FL as a function of ESL and EAL.

Figure 4:
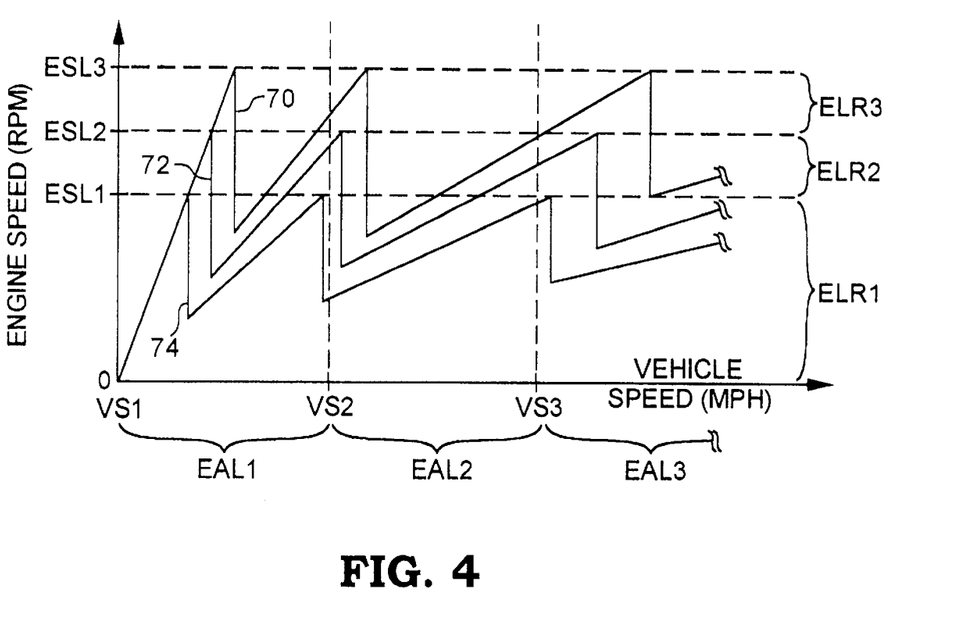
FIG. 4 is a plot of engine speed vs. vehicle speed illustrating engine control operation of the control computer embodiment shown in FIG. 3.

Referring now to FIG. 4, one preferred technique for determining ESL and EAL within blocks 60 and 64 respectively, is shown graphically as a plot of engine speed vs. vehicle speed. The engine speed axis (vertical axis) is partitioned into three engine load ranges; ELR1, ELR2 and ELR3. Each of these engine load ranges has a progressively larger engine speed limit (ESL) associated therewith; i.e. ELR1 has a maximum engine speed limit of ESL1, ELR2 has a maximum engine speed limit of ESL2 and ELR3 has a maximum engine speed limit of ESL3. Within block 60, control computer 20' is operable to determine a current engine load value from the commanded fuel signal. In one embodiment, engine load is determined as a ratio of the current commanded fuel value and a maximum commandable fueling value (maximum requestable torque), although the present invention contemplates other known techniques for determining engine load. In any case, control computer 20' is operable in block 60 to determine an engine speed limit ESL based on the current engine load value. For example, if the current engine load value is within engine load range ELR1, ESL=ESL1 as illustrated by waveform 74, if the current engine load value is within engine load range ELR2, ESL=ESL2 as illustrated by waveform 72, and if the current engine load value is within engine load range ELR3, ESL=ESL3 as illustrated by waveform 70. In one embodiment, ESL1=1200 RPM, ESL2 1600 RPM, ESL3= 1800 RPM, ELR1=<20% load, ELR2=20–80% load, and ELR3=>80% load. Alternatively, control computer 20' may be operable to interpolate intermediate engine speed limit values (ESLs) between ESL1, ESL2 and ESL3 so that an engine load value, rather than an engine load range, may be mapped to an appropriate engine speed limit value (ESL). For example, if the current engine load value is above some threshold value (e.g. 20% load), ESL=f(engine load) wherein f(engine load) interpolates between the ESL1, ESL2 and ESL3 values as a function of the current engine load value, and wherein ESL preferably increases as the engine load value increases. In either case, drivers are thus provided with the ability to operate the engine 22 at higher engine speeds, and correspondingly higher engine output torque levels, as the engine load increases. This type of engine speed limiting scheme forces gear shifting at lower engine speeds under low and moderate engine loads (e.g. downhill and flat road conditions), thereby maximizing fuel economy, while allowing for increased engine power when the need therefore exists at high engine loads (e.g. steep and moderate road grades. It is to be understood, however, that FIG. 4 illustrates only one example of determining ESL as a function of engine load within block 60 of FIG. 3, and that any number of engine load ranges and corresponding engine speed limits may be used having any desired engine speed and engine load range values, wherein such engine load ranges and engine speed limits are preferably stored in a look up table or other suitable format within memory 42, and are programmable via the service/recalibration tool 40 (FIG. 2). Alternatively, block 60 may be configured such that the engine speed limit value ESL is a continuous or piecewise continuous function of engine load, wherein a suitable equation relating the two parameters may be programmed within memory 42, preferably via service/recalibration tool 40.

The vehicle speed axis (horizontal axis) is partitioned into three engine acceleration limits; EAL1, EAL2 and EAL3, wherein each of the engine acceleration limits corresponds to a specific vehicle speed range. Thus, if control computer 20' determines within block 64 that VS1<vehicle speed (VS)<VS2, the engine acceleration limit (EAL) is set to EAL1. If VS2<VS<VS3, the engine acceleration limit (EAL) is set to EAL2. Finally, if VS>VS3, the engine acceleration limit (EAL) is set to EAL3. In one embodiment, VS1=0 mph, VS2=20 mph, VS3=40 mph, EAL1=300 rpm/sec, EAL2=500 rpm/sec and EAL3=no limit. It is to be understood, however, that FIG. 4 illustrates only one example of determining EAL as a function of vehicle speed within block 64 of FIG. 3, and that any number of vehicle speed ranges and corresponding engine acceleration limits may be used having any desired engine acceleration and vehicle speed range values, wherein such vehicle speed ranges and engine acceleration limits are preferably stored in a look up table or other suitable format within memory 42, and are programmable via the service/recalibration tool 40 (FIG. 2). Alternatively, control computer 20' may be operable to interpolate intermediate engine acceleration limit values (EALs) between VS1, VS2 and VS3 as described hereinabove with respect to the engine speed limit values (ESLs), wherein EAL preferably increases with increasing vehicle speed. Alternatively still, block 60 may be configured such that the engine acceleration limit value EAL is a continuous or piecewise continuous function of vehicle speed, wherein a suitable equation relating the two parameters may be programmed within memory 42, preferably via service/recalibration tool 40. Finally, vehicle acceleration limits (VAL) may be substituted for the engine acceleration limits (EAL), wherein vehicle acceleration can be computed in a known manner as a function of vehicle speed within block 64. In this case, the vehicle speed signal must also be provided to fuel limit calculation block 66 by routing the vehicle speed signal directly thereto as shown in phantom in FIG. 3.

In accordance with this engine acceleration limiting scheme, drivers are thus provided with the ability to operate the engine 22 at higher engine acceleration values, and correspondingly higher engine output torque levels, as the vehicle speed increases. This type of engine acceleration limiting scheme is provided along with the engine speed limiting scheme just described in order to discourage vehicle operators from attempting to defeat the engine speed limiting scheme. One way to defeat a strictly engine load-based engine speed limiting scheme such as that just described is to command high engine load (e.g. by commanding a high accelerator pedal position) to thereby trick control computer 20' into providing a higher engine speed limit (ESL) than would otherwise be necessary for acceptable shiftability on level road surfaces. By commanding 100% accelerator pedal position following each gear shift, vehicle operators could accordingly have the maximum engine speed limit available to them at all times. The engine acceleration limiting scheme just described thus provides a check on the engine speed limiting scheme by limiting engine acceleration to appropriate engine acceleration values within specific vehicle speed ranges. Vehicle operators attempting to defeat the engine speed limiting feature as just described will be unable to effectively do so since control computer 20 will limit engine acceleration to a suitable rate depending upon vehicle speed, and thereby disallow an increase in the engine speed limit (ESL) unless engine load is truly high due to road conditions and/or excessive vehicle mass. Referring again to FIG. 3, the fuel limit calculation block 66 is responsive to the engine speed limit value (ESL), the engine acceleration limit value (EAL) and to at least the engine speed signal on signal path 28 to provide the fuel limit value FL as long as the disable signal produced by block 62 is not present as described hereinabove. In one embodiment, fuel limit calculation block 66 is operable to compute a current engine acceleration value from the engine speed signal on signal path 28. Block 66 is further operable to compare the current value of the engine speed signal to the ESL value, and to compare the computed engine acceleration value to EAL, and produce a fuel limit value FL that limits engine speed to ESL and further limits engine acceleration to EAL. MIN block 58 is operable to provide the minimum of the RF and FL values as the commanded fuel value so that control computer 20' provides the FL value on signal path 46 as actual engine speed reaches ESL and/or as actual engine acceleration reaches EAL to thereby maintain engine speed below ESL and/or engine acceleration below EAL. In an alternate embodiment, block 64 is operable as described hereinabove to compute a vehicle acceleration limit (VAL), and block 66 is operable to compute a current vehicle acceleration value from the vehicle speed value on signal path 33. Block 66 is further operable, in this alternative embodiment, to compare the current value of the engine speed signal to the ESL value, to compare the computed vehicle acceleration value to VAL, and produce a fuel limit value FL that limits engine speed to ESL and further limits vehicle acceleration to VAL. Control computer 20' is thus operable, in this embodiment, to limit commanded fuel to thereby maintain engine speed below the ESL value and/or to maintain vehicle acceleration below the VAL value.

Figure 6:
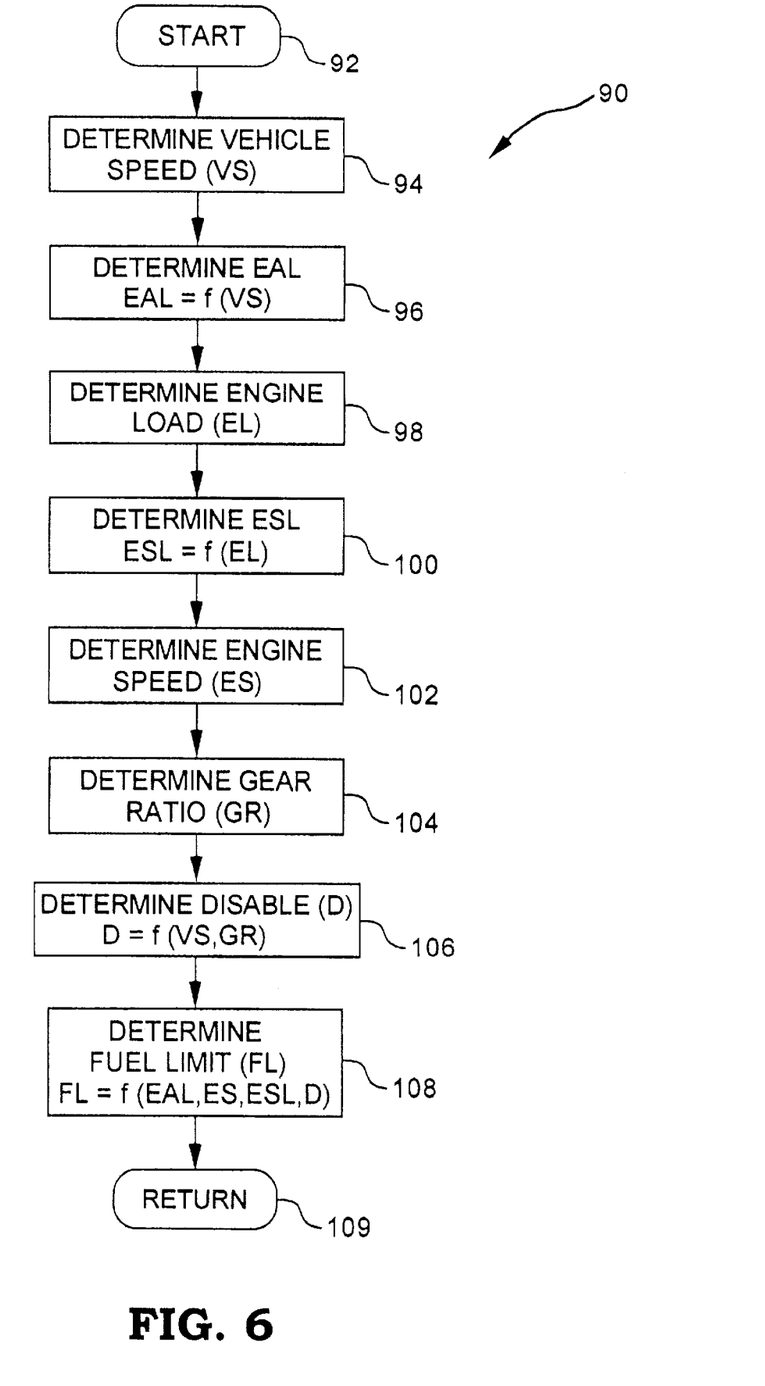
FIG. 6 is a flowchart illustrating one embodiment of a software algorithm for controlling engine operation with the system illustrated in FIGS. 2 and 3, in accordance with the present invention.

Referring now to FIG. 6, a flowchart is shown illustrating one preferred embodiment of a software algorithm 90 for controlling the commanded fuel value provided by control computer 20' on signal path 46 as described hereinabove. Preferably, algorithm 90 is stored within memory portion 42 (FIG. 2) and is executable by control computer 20' many times per second as is known in the art. Algorithm 90 starts at step 92 and at step 94, control computer 20' determines a current vehicle speed value VS, preferably by processing the vehicle speed signal on signal path 33 as is known in the art. Thereafter at step 96, control computer 20' is operable to determine an engine acceleration limit value EAL, preferably as a function of vehicle speed VS as described hereinabove. In an alternative embodiment, control computer 20' is operable at step 96 to determine a vehicle acceleration limit value VAL, preferably as a function of vehicle speed VS as described hereinabove. In any case, algorithm execution continues from step 96 at step 98 where control computer 20' is operable to determine an engine load value EL, preferably as a function of the commanded fuel signal on signal path 46 and a maximum commanded fuel value as described above. Algorithm execution continues from step 98 at step 100 where control computer 20' is operable to determine an engine speed limit value ESL, preferably as a function of the engine load value EL as described hereinabove.

Algorithm execution continues from step 100 at step 102 where control computer 20' is operable to determine a current engine speed value ES, preferably by processing the engine speed signal on signal path 28 as is known in the art. Thereafter at step 104, control computer 20' is operable to determine a presently engaged gear ratio GR, preferably as a ratio of the vehicle speed and engine speed values VS and ES respectively as is known in the art. Thereafter at step 106, control computer 20' is operable to determine a disable signal D, preferably as a function of vehicle speed VS and gear ratio GR as described hereinabove.

Algorithm execution continues from step 106 at step 108 where control computer 20' is operable to determine a fuel limit value FL, preferably as a function of EAL, ES, ESL and D, or alternatively as a function of VAL, ES, ESL and D, as described hereinabove. Thereafter at step 109, algorithm execution is returned to its calling routine. Alternatively, step 108 may loop back to step 94 for continual operation of algorithm 90.

Figure 7:
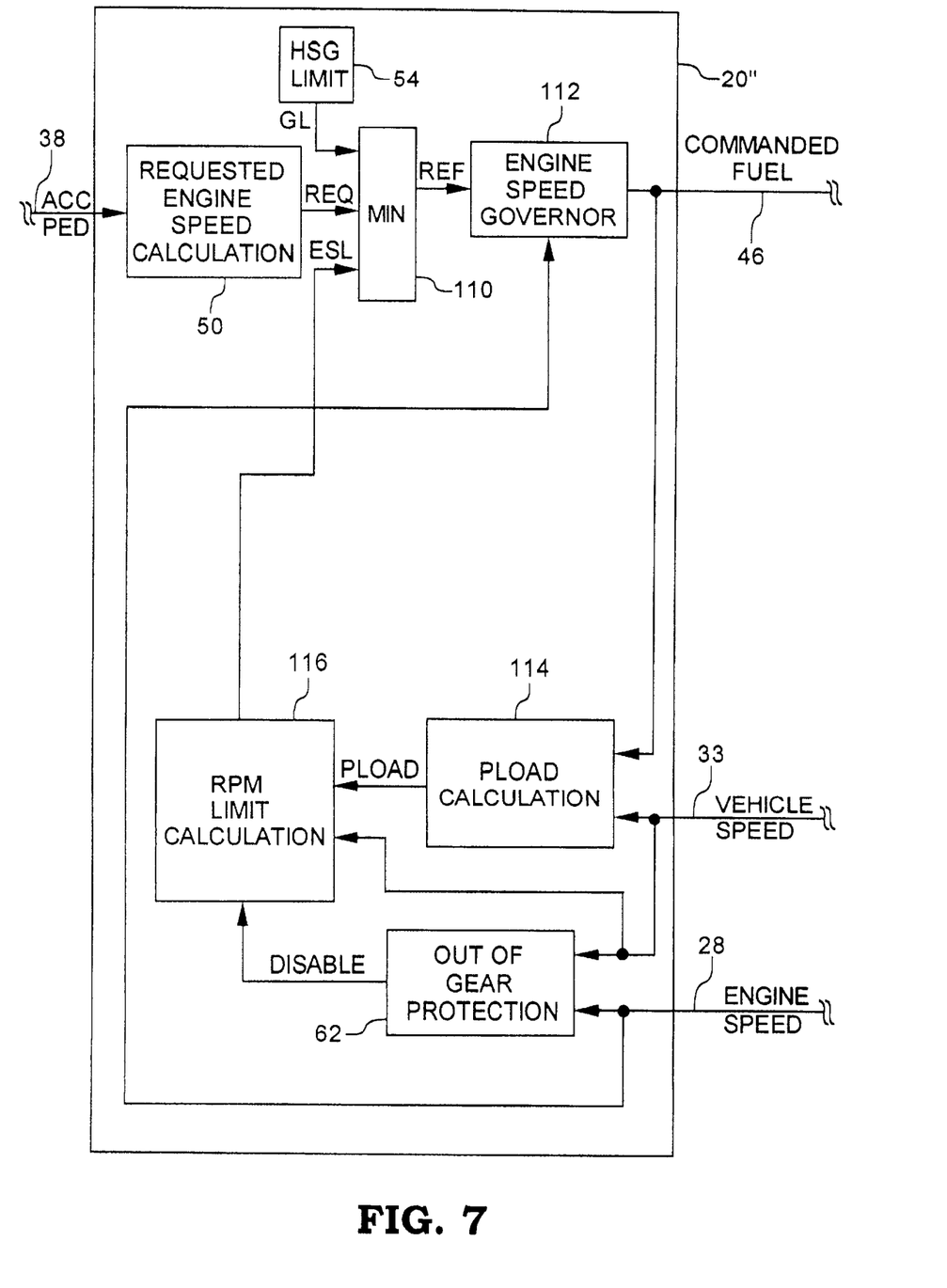
FIG. 7 is a diagrammatic illustration of another embodiment of the control computer of FIG. 2 showing some of the internal features thereof as they relate to the present invention.

Referring now to FIG. 7, another preferred embodiment 20" of a portion of the control computer 20 of FIG. 2 illustrating some of the internal features thereof as they relate to the present invention, is shown. While the internal features of control computer 20" illustrated in FIG. 7 are shown in block form, it is to be understood that such blocks are merely graphical representations of functions or processes that are performed by control computer 20". Moreover, it is to be understood that some of the blocks illustrated in FIG. 7 are identical in operation to like numbered blocks illustrated in FIG. 3, and that the operational description of such blocks will not be repeated for brevity. In any event, control computer 20" includes a requested engine speed calculation block 50 receiving the requested torque signal from accelerator pedal sensor 36 via signal path 38, and providing a requested engine speed value REQ, as described above, to one input of a MIN block 110.

A high speed governor (HSG) limit block 54 provides an HSG engine speed limit value GL, as described above, to a second input of MIN block 110. MIN block 110 also receives a third engine speed limit value ESL from block 116, as will be described more fully hereinafter, and produces a reference engine speed value REF at an output thereof.

The engine speed reference value REF is provided to a known engine speed governing block 112 which is responsive to REF and the engine speed signal on signal path 28 to produce the commanded fuel signal on signal path 46. The commanded fuel signal is also provided to one input of a PLOAD calculation block 114, and the vehicle speed signal on signal path 33 is provided to a second input of block 114. Block 114 is responsive to the commanded fuel and vehicle speed signals to produce a PLOAD value at an output thereof, wherein the PLOAD value is a pseudo-load value that preferably indicative of total vehicle weight, vehicle acceleration rate and/or engine driving force as will be described more fully hereinafter with respect to FIG. 8. An out of gear protection block 62 is also included and is preferably responsive to the engine and vehicle speed signals to produce a disable signal at an output thereof as described above.

Control computer 20" also includes an RPM limit calculation block 116 that is preferably responsive to the PLOAD value produced by block 114, the vehicle speed signal on signal path 33 and the disable signal produced by block 62 to produce an engine speed limit value ESL, as will be described in greater detail hereinafter. MIN block 110 is responsive to the GL, REQ and ESL values to provided the minimum thereof as the engine speed reference value REF provided to the engine speed governor block 112, wherein block 112 is operable to provide the commanded fuel value and thereby control engine fueling based on the minimum of the GL, REQ and ESL values.

Figure 8:
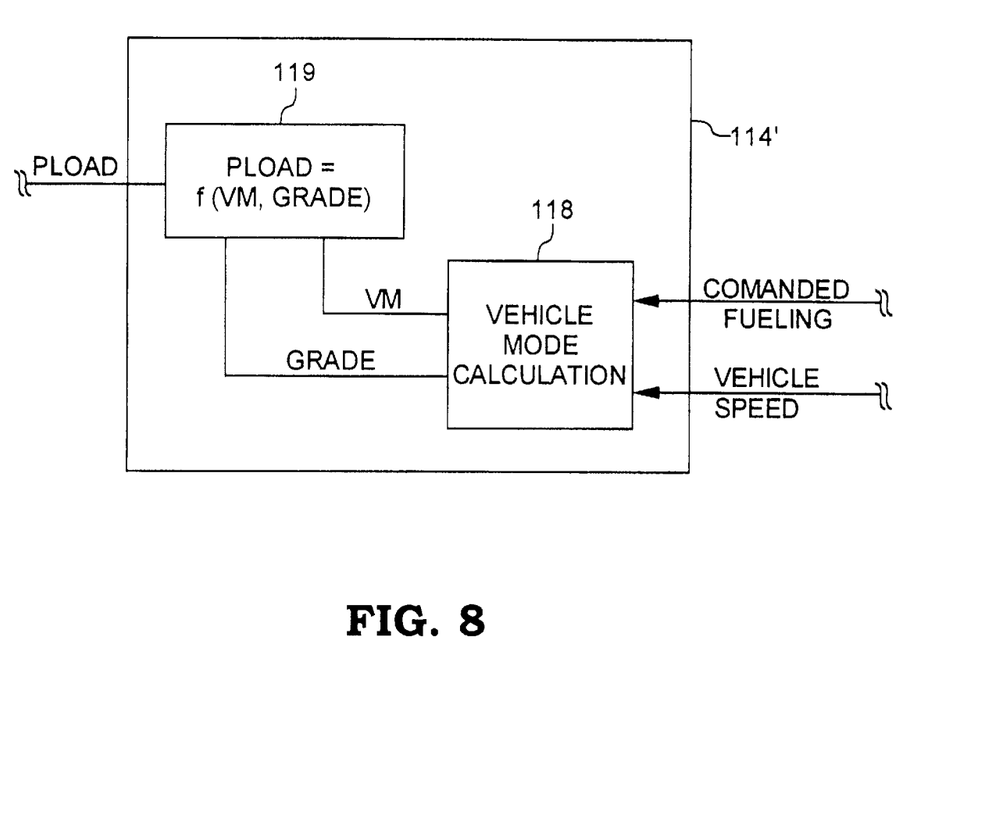
FIG. 8 is a diagrammatic illustration of one embodiment of the PLOAD calculation block of FIG. 7, according to the present invention.

Referring to FIG. 8, one preferred embodiment 114' of the PLOAD calculation block 114, in accordance with the present invention, is shown. Within block 114', a vehicle mode calculation block 118 receives at least the commanded fuel and vehicle speed signals and produces an estimated vehicle mass value VM and a grade value GRADE corresponding to the grade of the road currently being traveled. In one embodiment, the VM value is crudely estimated in accordance with Newton's second law which relates vehicle driving force to vehicle mass and vehicle acceleration via the equation F=ma, wherein "F" is the vehicle driving force, "m" is the vehicle mass and "a" is the vehicle acceleration. The GRADE value is determined by taking into account that the vehicle driving force "F" in the above equation is actually a combination of a number of forces acting with and against the forward momentum of the vehicle. Specifically, the vehicle driving force "F" in the above equation is a combination of at least a force due to engine torque ($F_T$), a resistance force due to wind, etc. ($F_W$), a rolling resistance force due wheel/tire friction ($F_R$) and a force due to road grade conditions ($F_G$). In this embodiment, Newton's second law may be manipulated to provide an estimate of $F_G$ in accordance with the equation:

$$F_G = m*a - F_T + F_R + F_W \tag{1}$$

Block 118 produces a GRADE value based on known relationships between the $F_G$ value and the actual grade of the road. The VM and GRADE values are provided to a PLOAD calculation block 119 which produces the PLOAD signal or value as a function of the VM and GRADE values. In one embodiment, control computer 20" includes a table therein relating VM and GRADE values to a PLOAD value. One example of a simple table relating PLOAD to VM and GRADE values is shown below as TABLE 1, wherein the value of VM is used to determine only whether the vehicle is loaded (i.e. a trailer connected thereto) or is operating in a so-called bob-tail manner (i.e. no trailer connected thereto). In making such a determination, vehicle mode calculation block 118 is preferably operable to estimate the vehicle mass as described hereinabove, compare this estimated mass value to a predefined mass value (e.g. 50,000 lbs.), and produce a VM value corresponding to a loaded vehicle if the estimated mass is above the predefined mass value or a VM value corresponding to a bob-tail vehicle if the estimated mass is below the predefined mass value. In this simple table, the $F_G$ value is used to determine whether the vehicle is traveling up a grade (uphill), on a flat road surface (flat) or down a grade (downhill). In so doing, vehicle mode calculation block 118 is preferably operable to determine a road grade estimation, based on the $F_G$ value and known relationships between $F_G$ and actual road grade conditions, and assign to GRADE a corresponding road grade condition value. In the example illustrated in Table 1, the GRADE signal or value provided to block 119 is assigned an "uphill" designation if $F_G$ corresponds to a −2.0 or more degree grade, a "flat" designation if $F_G$ corresponds to between a −2.0 and a 2.0 degree grade, and a "downhill" designation if $F_G$ corresponds to a +2.0 or more degree grade. Block 119 includes Table 1 which relates the VM and GRADE values to a PLOAD value PL1, PL2 or PL3, wherein PL3 corresponds to a greater vehicle/engine load condition than PL2 which corresponds to a greater vehicle/engine load condition than PL1.

TABLE 1

| VM (rows) GRADE (cols.) | UPHILL | FLAT | DOWNHILL |
|---|---|---|---|
| LOADED | PL3 | PL2 | PL1 |
| BOB-TAIL | PL2 | PL1 | PL1 |

Those skilled in the art will recognize that Table 1 illustrates only a simple example of relating VM and $F_G$ to a pseudo-load value PLOAD, and that more sophisticated tables relating VM and GRADE values to PLOAD value are intended to fall within the scope of the present invention. Alternatively, control computer 20" may include one or more equations, either continuous or piece-wise continuous, or graphs relating PLOAD to VM and $F_G$.

Figure 9:
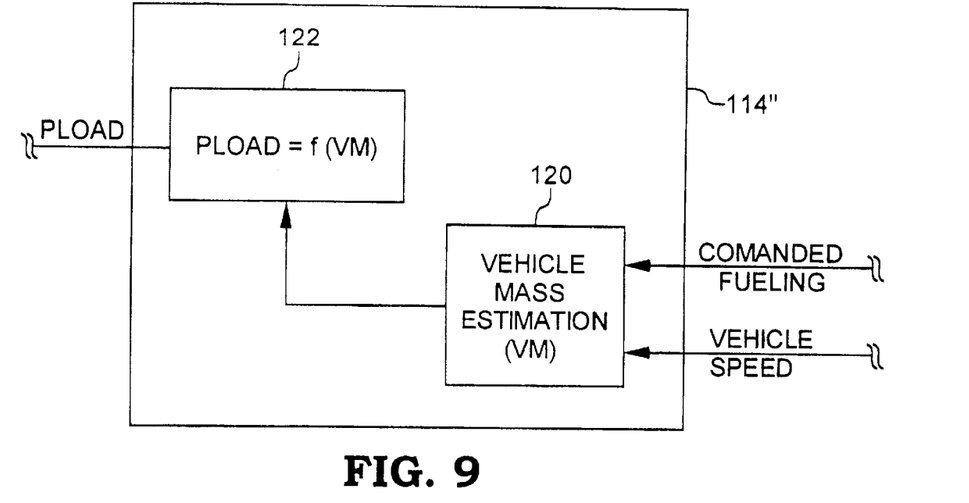
FIG. 9 is a diagrammatic illustration of another embodiment of the PLOAD calculation block of FIG. 7, according to the present invention.

Referring now to FIG. 9, an alternative embodiment 114" of the PLOAD calculation block 114 of FIG. 7, is shown in accordance with the present invention. Within block 114", a vehicle mass estimation block 120 receives the commanded fuel and vehicle speed signals and produces an estimated vehicle mass value VM at an output thereof. In one embodiment, the VM value is computed in accordance with Newton's second law which relates vehicle driving force to vehicle mass and vehicle acceleration via the equation F=ma, wherein "F" is the vehicle driving force, "m" is the vehicle mass and "a" is the vehicle acceleration. In this embodiment, vehicle driving force is preferably determined from commanded fuel values by relating commanded fuel to expected output torque values based on known engine specifications. Vehicle acceleration "a" is preferably determined as a difference in vehicle speed over a given time interval, so that the estimated vehicle mass is preferably determined by block 120 according to the equation:

$$m = (\Delta F * \Delta t)/\Delta VS \tag{2}$$

wherein VS is the vehicle speed. The present invention contemplates that other known techniques may alternatively be used to estimate vehicle mass, wherein such techniques may be based on any of the engine/vehicle operating parameters discussed herein and/or on other engine/vehicle operating parameters commonly available to control computer 20" as is known in the art. In any event, the estimated vehicle mass value VM is preferably provided to a mapping block 122 that is operable to map the vehicle mass value VM to a pseudo-load value PLOAD. In one embodiment, memory 42 preferably includes a number of vehicle mass values stored therein, wherein block 122 is operable to map the estimated vehicle mass value VM to an appropriate one of the number of vehicle mass values stored within memory 42. For example, memory 42 may include three vehicle mass values m1, m2 and m3, each having a greater mass value than the previous value, stored therein. If the estimated vehicle mass, m, is less than or equal to m1, block 122 is operable to set PLOAD=PL1. Likewise, if the estimated vehicle mass, m, is greater than or equal to m3, block 122 is operable to set PLOAD=PL3. If the estimated vehicle mass, m, is between m1 and m3, block 122 is operable to set PLOAD=PL2. In an alternative embodiment, block 122 is omitted and the estimated vehicle mass value VM is provided as the PLOAD value at the output of block 114.

Those skilled in the art will recognize that while block 114" of FIG. 9 has been shown and described as operable to estimate vehicle mass, based on current vehicle acceleration and applied driving force, block 114" may alternatively be configured to estimate either of the remaining operating parameters of the equation F=ma. For example, if the vehicle mass is known, or is otherwise estimated, PLOAD may be provided by block 114" as an estimated vehicle acceleration parameter based on current vehicle mass and applied driving force. As another example, if the vehicle mass is known or otherwise estimated, PLOAD may be provided by block 114" as an estimated driving force parameter based on current vehicle mass and current vehicle acceleration. In any case, it should be apparent that the PLOAD value is a measure of the current vehicle load conditions, which conditions are generally dictated at any instant of time by total vehicle weight, current road grade conditions and other vehicle/engine operating conditions.

Figure 10:
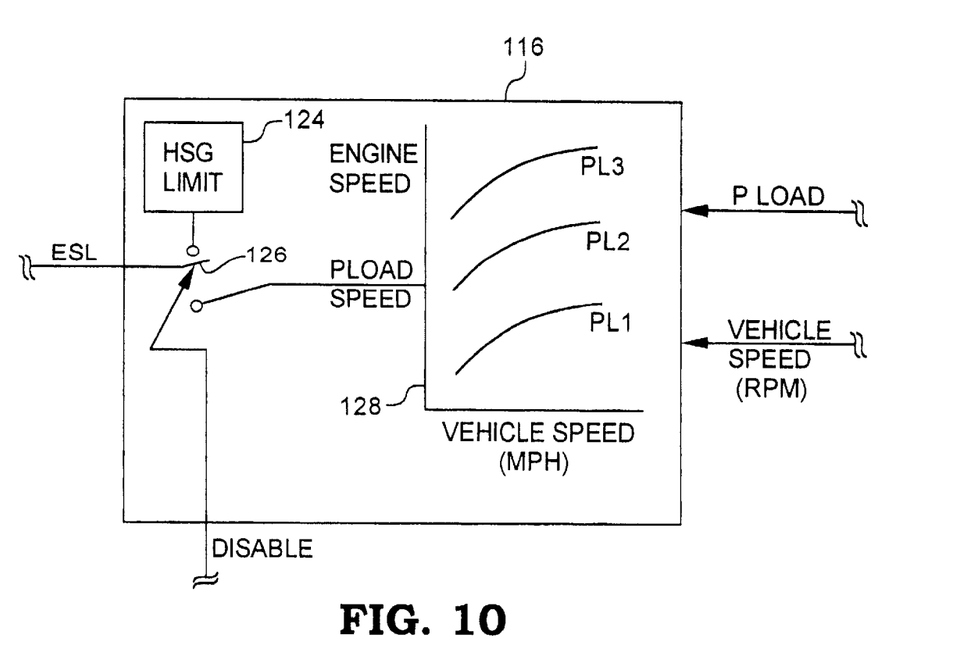
FIG. 10 is a diagrammatic illustration of one embodiment of the RPM calculation block of FIG. 7, according to the present invention.

Referring now to FIG. 10, one embodiment of the RPM limit calculation block 116 of FIG. 7, in accordance with the present invention, is shown. Preferably, memory 42 includes a number of engine speed values stored therein as a function of PLOAD values and vehicle speed values. One technique for storing such values is illustrated in FIG. 10 in graphical form wherein a number of PLOAD waveforms are plotted against vehicle speed and engine speed. Depending upon the PLOAD value provided thereto by block 114' or 114" and the current vehicle speed, a control computer 20" determines a desired engine speed value therefrom and provides this value as a PLOAD speed value. In the example illustrated in FIG. 10, three such PLOAD waveforms, PL1, PL2 and PL3, are provided which correspond to the three PLOAD values PL1, PL2 and PL3 described in accordance with the various embodiments of block 114. Thus, if PLOAD is set to PL2 for example, the PL2 waveform that corresponds to the current vehicle speed is used to choose an appropriate engine speed value. Alternatively, the estimated vehicle mass value VM may be provided as the PLOAD input to block 116 wherein control computer 20" is operable to interpolate between the various PLOAD waveforms to choose an appropriate engine speed value. Another technique for storing engine speed values within memory 42 is to provide a three-dimensional table that maps discrete PLOAD and vehicle speed values to desired engine speed values. Alternatively, memory 42 may have a continuous or piecewise continuous equation stored therein, wherein control computer 20" is operable to compute a desired engine speed value based on current vehicle speed and PLOAD value. In any case, block 116 is preferably operable to provide the desired engine speed limit value as PLOAD speed to one end of a switch 126.

Block 116 also includes a high speed governor limit block 124, preferably identical to block 54 of FIG. 7, which provides a governor limit engine speed value GL to an opposite end of switch 126. An output of switch 126 provides the engine speed limit value ESL to MIN block 110 (FIG. 7). Switch 126 is controlled by the disable signal produced by block 62 so that block 116 provides the HSG limit value GL as the engine speed limit value ESL to MIN block 110 when the disable signal is present. The MIN block 110 is accordingly operable to provide the minimum of the GL and REQ values as the engine speed reference value REF. If, however, the disable signal is not present, switch 126 is controlled so that block 116 provides PLOAD speed as the engine speed limit value ESL to MIN block 110. MIN block 110 is accordingly operable to provide the minimum of the GL, REQ and ESL values as the engine speed reference value REF. It is to be understood that switch 126 is preferably not a physical switch but rather a "software switch" in the sense that control computer 20" is operable to provide either the GL or PLOAD speed values as the ESL value depending upon the status of the disable signal, as is known in the art.

Figure 11:
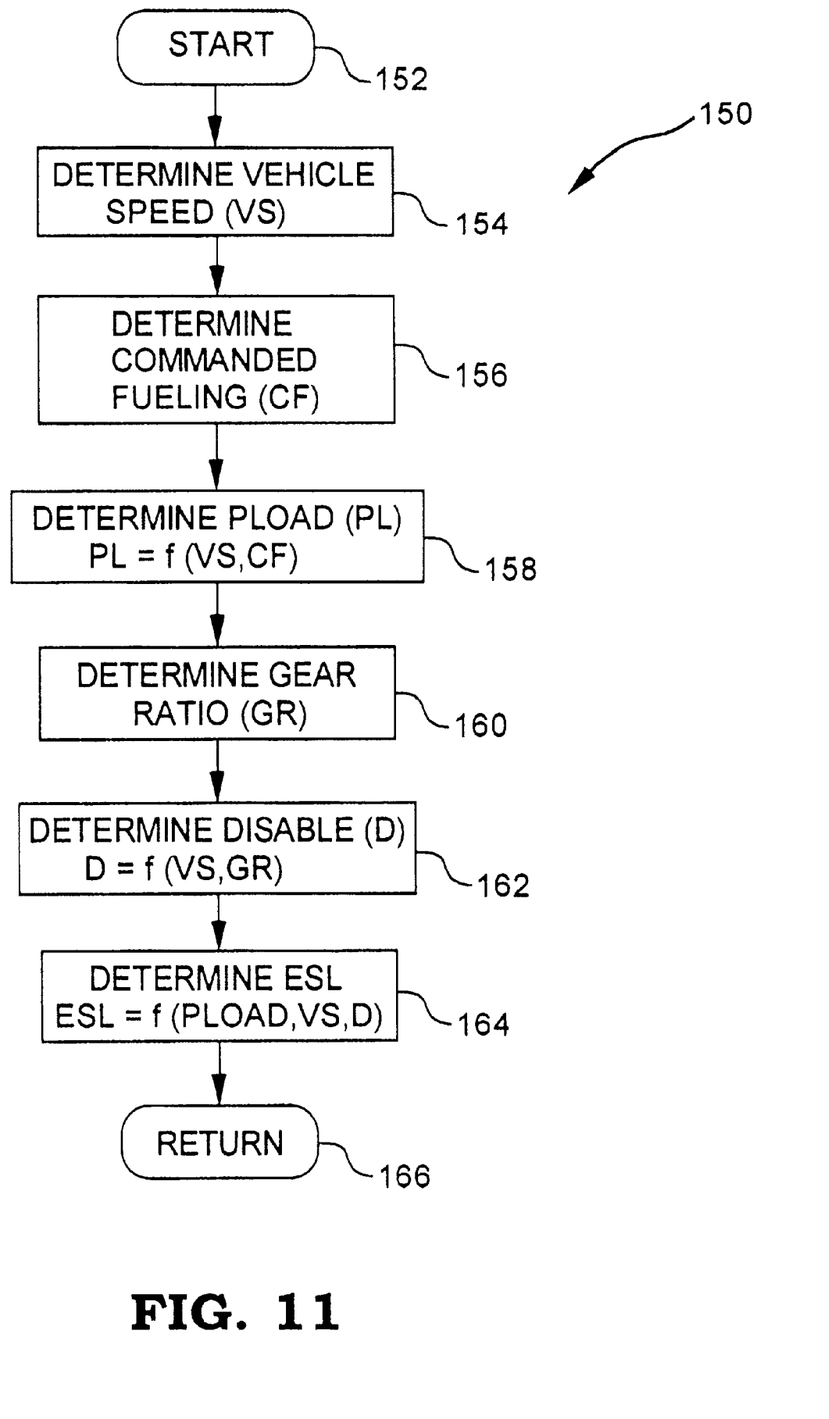
FIG. 11 is a flowchart illustrating one embodiment of a software algorithm for controlling engine operation with the system illustrated in FIGS. 2 and 7, in accordance with the present invention.

Referring now to FIG. 11, a flowchart is shown illustrating one preferred embodiment of a software algorithm 150 for producing the ESL value as described above with respect to FIGS. 7–10. Preferably, algorithm 150 is stored within memory portion 42 (FIG. 2) and is executable by control computer 20" many times per second as is known in the art. Algorithm 150 starts at step 152 and at step 154, control computer 20" determines a current vehicle speed value VS, preferably by processing the vehicle speed signal on signal path 33 as is known in the art. Thereafter at step 156, control computer 20" is operable to determine a commanded fueling value CF, preferably as described hereinabove. Algorithm execution continues from step 156 at step 158 where control computer 20" is operable to determine a pseudo-load value PL, preferably as a function of at least the commanded fuel signal on signal path 46 and the vehicle speed signal on signal path 33, in accordance with any of the techniques described hereinabove.

Algorithm execution continues from step 158 at step 160 where control computer 20" is operable to determine a presently engaged gear ratio GR, preferably as a ratio of the vehicle speed and engine speed values VS and ES respectively as is known in the art. Thereafter at step 162, control computer 20" is operable to determine a disable signal D, preferably as a function of vehicle speed VS and gear ratio GR as described hereinabove. Algorithm execution continues from step 162 at step 164 where control computer 20" is operable to determine an engine speed limit value ESL, preferably as a function of PLOAD, VS and D, as described hereinabove. Thereafter at step 166, algorithm execution is returned to its calling routine. Alternatively, step 164 may loop back to step 15 for continual operation of algorithm 150.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected. For example, while control computer 20' has been illustrated and described as controlling engine speed and engine (or vehicle) acceleration via a fuel limit value FL, control computer 20' could alternatively be configured to control engine speed and engine (or vehicle) acceleration via an engine speed limit value using some of the concepts described with respect to FIG. 7. Likewise, while control computer 20″ has been illustrated and described as controlling engine speed and engine (or vehicle) acceleration via an engine speed limit value ESL, control computer 20″ could alternatively be configured to control engine speed and engine (or vehicle) acceleration via a fuel limit value FL using some of the concepts described with respect to FIG. 3. In either case, the control computer is ultimately operable to control engine operation via control of the commanded fueling signal. Those skilled in the art will recognize that any of a variety of known techniques may be used to effectuate the engine control concepts of the present invention, the importance of any such techniques lying not in the specifics of the techniques themselves but rather in their ability to carry out the engine control concepts of the present invention.

What is claimed is:

1. A system for controlling an internal combustion engine, comprising:

means for sensing speed of an internal combustion engine and producing a corresponding engine speed signal;

means for sensing road speed of a vehicle carrying said engine and producing a corresponding vehicle speed signal;

a fuel system responsive to a fueling signal to supply fuel to said engine; and a control computer producing said fueling signal, said control computer responsive to said vehicle speed signal and said fueling signal to determine an estimated vehicle mass value and to at least said vehicle mass value to determine an estimated engine load value, said control computer determining an engine speed limit based on said estimated engine load value and said vehicle speed value and controlling said fueling signal to thereby maintain said engine speed value below said engine speed limit.

2. The system of claim 1 further including an engine speed governor responsive to a reference engine speed and said engine speed signal to produce said fueling signal;

and wherein said control computer is operable to limit said reference engine speed to said engine speed limit to thereby control said fueling signal and maintain said engine speed value below said engine speed limit.

3. The system of claim 1 wherein said control computer is further responsive to said vehicle speed value and said fueling signal to determine a road grade value, said control computer determining said estimated engine load value based on said estimated vehicle mass value and said road grade value.

4. The system of claim 1 wherein further including means for determining a currently engaged gear ratio of a transmission coupled to said engine;

and wherein said control computer is operable to delay production of said engine speed limit for a time period defined by said vehicle speed signal.

5. The system of claim 4 wherein said control computer is operable to increase said time period as said vehicle speed signal decreases.

6. The system of claim 4 wherein said control computer is operable to provide no delay in production of said engine speed limit if said vehicle road speed is above a predefined vehicle speed value.

7. A method for controlling an internal combustion engine carried by a vehicle, comprising the steps of:

sensing engine speed of an internal combustion engine;

sensing vehicle speed of a vehicle carrying said engine and determining a corresponding vehicle acceleration value;

determining an engine fueling value;

estimating a vehicle mass value based on said vehicle acceleration value and said engine fueling value;

estimating an engine load value based on at least said estimated vehicle mass value;

determining an engine speed limit based on said estimated engine load value and said vehicle speed; and controlling engine speed of said engine to thereby maintain said engine speed below said engine speed limit.

8. The method of claim 7 further including the step of estimating a road grade value based on said at least said engine fueling value and said vehicle acceleration value;

and wherein said step of estimating an engine load value includes estimating said engine load value based on said estimated vehicle mass value and said estimated road grade value.

9. The method of claim 7 further including the steps of:

determining a currently engaged gear ratio of a transmission coupled to said engine; and delaying said step of controlling said engine speed for a time period defined by said vehicle speed signal if no gear ratio is currently engaged with said engine and if said vehicle speed is below a vehicle speed threshold value.

* * * * *